United States Patent
Chayut

(10) Patent No.: US 7,861,067 B1
(45) Date of Patent: Dec. 28, 2010

(54) ADJUSTABLE CYCLE PIPELINE SYSTEM AND METHOD

(75) Inventor: Ira Chayut, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 484 days.

(21) Appl. No.: 10/976,532

(22) Filed: Oct. 28, 2004

(51) Int. Cl.
*G06F 9/00* (2006.01)

(52) U.S. Cl. ................................ 712/220; 712/208

(58) Field of Classification Search .......... 712/220, 712/219, 227, 208
See application file for complete search history.

(56) References Cited

U.S. PATENT DOCUMENTS

| | | | | |
|---|---|---|---|---|
| 6,023,776 | A * | 2/2000 | Ozaki | 714/55 |
| 6,065,126 | A * | 5/2000 | Tran et al. | 713/401 |
| 6,167,529 | A * | 12/2000 | Dalvi | 713/501 |
| 6,799,134 | B2 * | 9/2004 | Borchers et al. | 702/125 |
| 7,392,406 | B2 * | 6/2008 | Yoon et al. | 713/300 |

* cited by examiner

*Primary Examiner*—Alford W Kindred
*Assistant Examiner*—Benjamin P Geib

(57) ABSTRACT

The present invention utilizes an asynchronous pipeline cycle to facilitate increased average pipeline processing speed. Present invention adjustable cycle pipeline systems and methods minimize "stalls" in execution stages that would otherwise be required to compensate for differences in execution periods. In one embodiment, an adjustable cycle pipeline system includes a fetch stage, a decode stage, an execution stage, and a write stage. The fetch stage fetches information associated with an operation. The decode stage decodes the instructions including determining an instruction execution period. The execution stage executes instructions in accordance with the execution period and the write stage writes the results. In one exemplary implementation the instruction execution period corresponds to a particular number execution sub-clock cycles and the decode stage includes a decode operation timetable for indicating a period of time to complete execution of an operation. The sub-clock controls operations of the execution stage.

16 Claims, 4 Drawing Sheets

100

US 7,861,067 B1

ADJUSTABLE CYCLE PIPELINE SYSTEM AND METHOD

FIELD OF THE INVENTION

The present invention relates to the field of information processing. More particularly the present invention relates to a sub-clock pipeline system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these activities involve information processing with demands for greater performance and functionality increases. Pipelining the operations is one approach often utilized to increase performance. However, infrequent operations requiring relatively long periods of time to execute typically have a disproportionate adverse impact on the overall performance of traditional pipeline approaches.

Numerous electronic devices include processors that operate by executing programs comprising a series of instructions. These programs and their series of instructions are typically referred to as software. Software instructions include directions that guide processor device functions in the performance of useful tasks. The utility a processor device provides often depends upon the speed and efficiency at which instructions included in a software program are executed. Traditionally, tasks are performed in a serial manner in which one operation is performed and then the next operation is performed, one after another in a linear fashion. A purely sequential system typically requires a lot more time to complete a series of operations since one operation is not performed until the preceding operation is completed. Some traditional systems attempt to increase speed with pipelining.

Pipelining typically involves dividing operations associated with an instruction into stages and "overlapping" of instruction stage processing in an attempt allow "parallel" processing in which operations associated with one instruction are begun before the completion of operations from a previous instruction. For example, numerous traditional pipeline techniques include a fetch stage, decode stage, execute stage, and write stage. Pipelining is utilized by a variety of different applications. For example, there are a number of stages or processes included in a typical graphics pipeline and various manipulations of pixel data are implemented at each stage in the pipeline. These manipulations often involve numerous computational processes some of which are completed relatively quickly and others take a relatively long time to complete. The speed at which at which images are rendered in typical graphics systems is often critical to proper presentation of the information. Slow rendering rates often cause undesirable choppy or "jerky" presentations which usually results in a user experience that is non-immersive and unpleasant.

Conventional attempts at addressing pipeline timing are usually inefficient and/or resource intensive. In traditional pipelines, pipeline stage cycles are set at a fixed time corresponding to the slowest operation execution time. For example, each pipeline stage cycle is set to be equal to execution operations that take the longest period of time, even though the majority of execution operations can be performed faster. This approach tends to be relatively simplistic but tends to slow down the throughput of whole device. Some traditional pipeline systems attempt to address pipeline cycle time by adding hardware resources to speed up the pipeline which increases cost. Other traditional pipeline systems attempt to break slow paths down by adding another pipeline phase or cycle. In these systems, slow operations (e.g., a multiply) might take two cycles instead of one. However, these approaches also add two cycles to every operation or require sophisticated tracking to know that results of some execution operations can not be used until two cycles later.

Attempts have been made at self-timed logic to speed up pipelines. However, these attempts typically end up consuming more power and typically take longer to complete operations. In addition, trying to analyze and test self-timed logic is very complicated and resource intensive. Normal tools usually look at differences between two registers (e.g., the registers are gate keepers) for results at a particular time and what happens in one clock cycle is analyzed. However, in self-timed circuits there is usually a domino effect in that something that happens in one part of the chip feeds back and forth with other parts of the chip. This means numerous register results have to be analyzed at the same time when a chip is tested and analyzed.

SUMMARY

The present invention utilizes an asynchronous pipeline cycle to facilitate increased average pipeline processing speed. Present invention adjustable cycle pipeline systems and methods minimize "stalls" in execution stages that would otherwise be required to compensate for differences in execution periods. In one embodiment, an adjustable cycle pipeline system includes a fetch stage, a decode stage, an execution stage, and a write stage. The fetch stage fetches information associated with an operation. The decode stage decodes the instructions including determining an instruction execution period. The execution stage executes instructions in accordance with the execution period and the write stage writes the results. In one exemplary implementation the instruction execution period corresponds to a particular number execution sub-clock cycles and the decode stage includes a decode operation timetable for indicating a period of time to complete execution of an operation. The sub-clock controls operations in the execution stage and is utilized to determine a pipeline stage period.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1:
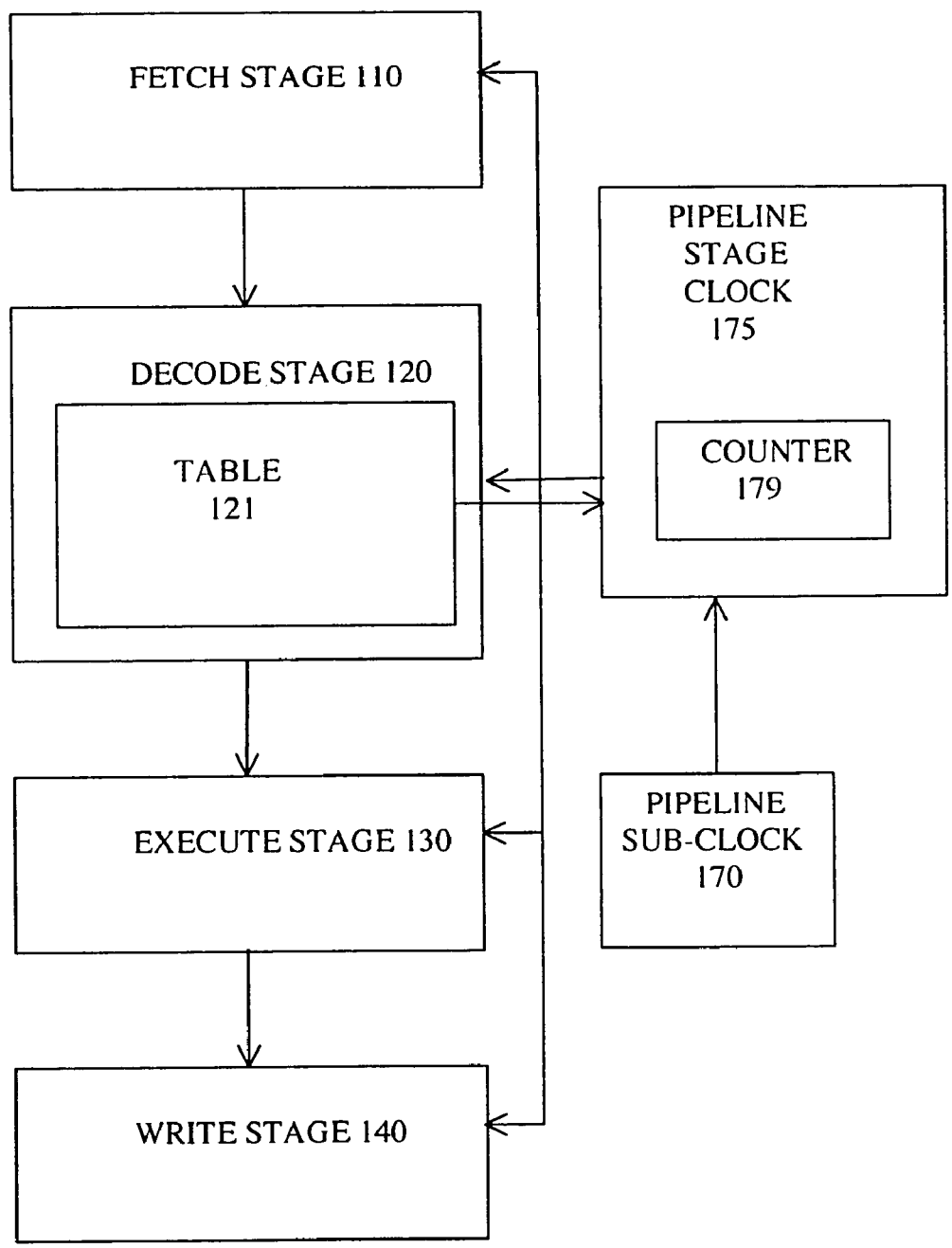
FIG. 1 is a block diagram of an exemplary adjustable cycle pipeline system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions, which follow, are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1 is a block diagram of adjustable cycle pipeline system 100 in accordance with one embodiment of the present invention. Sub-clock pipeline 100 includes fetch stage 110, decode stage 120, execution stage 130, write stage 140, pipeline sub-clock 170 and pipeline stage clock 175. Fetch stage 110 is communicatively coupled to decode stage 120 which is communicatively coupled to execution stage 130. Execution stage 130 is communicatively coupled to write stage 140. Pipeline sub-clock 170 is coupled to pipeline stage clock 175. Pipeline stage clock 175 is coupled to fetch stage 110, decode stage 120, execution stage 130, and write stage 140.

The components of adjustable cycle pipeline system 100 cooperatively operate to perform pipeline operations. Fetch stage 110 fetches information associated with a pipeline operation. Decode stage 120 decodes instructions including determining an instruction execution period. The instruction execution period can vary for different operations. In one exemplary implementation, the instruction execution period corresponds to a number of pipeline sub-clock cycles (e.g., generated by pipeline sub-clock 170). Execution stage 130 executes instructions in accordance with the execution period. Pipeline sub-clock 170 controls the clock frequency that is generated by the pipeline stage clock. Pipeline stage clock 175 generates a pipeline stage clock that controls the pipeline stage cycle or rate at which results of a pipeline stage are forwarded to a subsequent pipeline stage. For example, the speed at which information is forwarded from fetch stage 110 to decode stage 120, from decode stage 120 to execution stage 130, and from execution stage 130 to write stage 140. Write stage 140 writes results (e.g., to a memory). This speed can be adjusted on a cycle-by-cycle basis to accommodate the operation in the execute stage during that cycle.

In one embodiment of the present invention, a pipeline stage cycle is asynchronous and can be adjusted every clock cycle. For example, a pipeline stage cycle (e.g., the instruction execution period) corresponds to a number of pipeline sub-clock cycles and a pipeline stage cycle is altered by increments of the sub-clock cycle. In one exemplary implementation, pipeline stage clock 175 includes a counter 179 that counts the number of pipeline sub-clock cycles. When the counter 179 counts a predetermined number of pipeline sub-clock cycles associated with execution of on operation in execution stage 130, pipeline stage clock 175 asserts a trigger edge of the pipeline stage clock to initiate a new pipeline stage cycle in the pipeline stages.

In one exemplary implementation, decode stage 120 includes a decode operation time table 121 for indicating the period of time and/or the number of pipeline sub-clock cycles to complete execution of an operation. When a particular operation is being performed in the execution stage the pipeline stage cycle is set to equal the number of pipeline sub-clock cycles indicated in the decode operation time table 121. In one embodiment of the present invention, the number of pipeline sub-clock cycles indicated by the decode operation time table 121 are communicated to pipeline stage clock 175 and when the counter 179 counts that number of pipeline sub-clock cycles, pipeline stage clock 175 asserts a trigger edge of the pipeline stage clock. In one embodiment, execution time of different operations are non-integral full-cycle multiples of one another.

Figure 2:
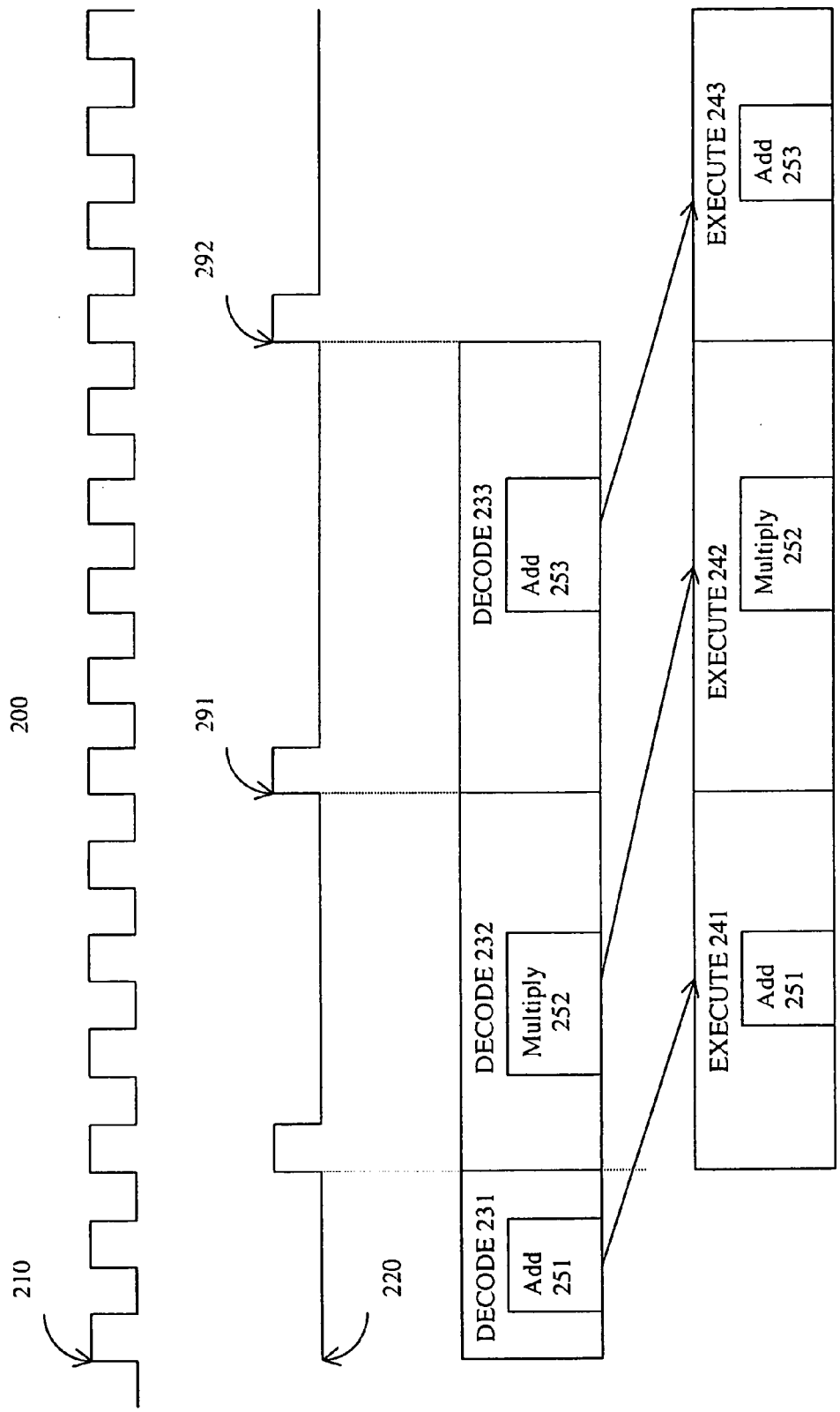
FIG. 2 is a timing diagram showing an exemplary timing relationship between a pipeline stage clock and a pipeline sub-clock in accordance with one embodiment of the present invention.

FIG. 2 is a timing diagram 200 showing an exemplary timing relationship between a pipeline stage clock and a pipeline sub-clock in accordance with one embodiment of the present invention. Sub-clock signal 210 controls the period of pipeline stage clock signal 220 based upon the execution time of various operations. For example, the decode 231 of addition operation 251 indicates that the addition operation 251 takes 4 sub-clock cycles. When addition operation 251 enters the execution stage and begins execution 241 a counter (e.g., counter 179) counts 4 cycles of the sub-clock signal 210 and asserts a trigger edge of the pipeline stage clock signal 220 at time 291. The decode 232 of multiply operation 252 indicates that the multiply operation 252 takes 5 sub-clock cycles. When multiply operation 252 enters the execution stage and begins execution 242 the counter counts 5 cycles of the sub-clock signal 210 and asserts a trigger edge of the pipeline stage clock signal 220 at time 292. Similarly, the decode 233 of addition operation 253 indicates that the addition operation 253 takes 4 sub-clock cycles. When addition operation 253 enters the execution stage and begins execution 243 the counter counts 4 cycles of the sub-clock signal 210 and asserts a trigger edge of the pipeline stage clock 220. The periods of pipeline stage signal 220 vary according to the count of sub-clock signal 210 cycles corresponding to execution of an operation.

In one embodiment of the present invention, the variations of the pipeline stage cycles are limited by minimum time constraints of stages other than the execution stage and the minimum time constraint of the operation in the execution stage. For example, if a fetch stage, decode stage, and/or write stage require a certain minimum period of time to complete the respective stage operations, a pipeline stage clock period is set to be equal to or greater than the minimum time constraints. In one exemplary implementation, the minimum time for a decode stage to perform its operations is number of sub-clock cycles for a decode stage (e.g., 2 cycles as shown in FIG. 2). Ensuring the pipeline stage period is equal or greater than the amount of time it takes stages other than the execution stage to complete an operation makes sure the other stages are not prematurely truncated without being able to provide results for subsequent stages.

Figure 3:
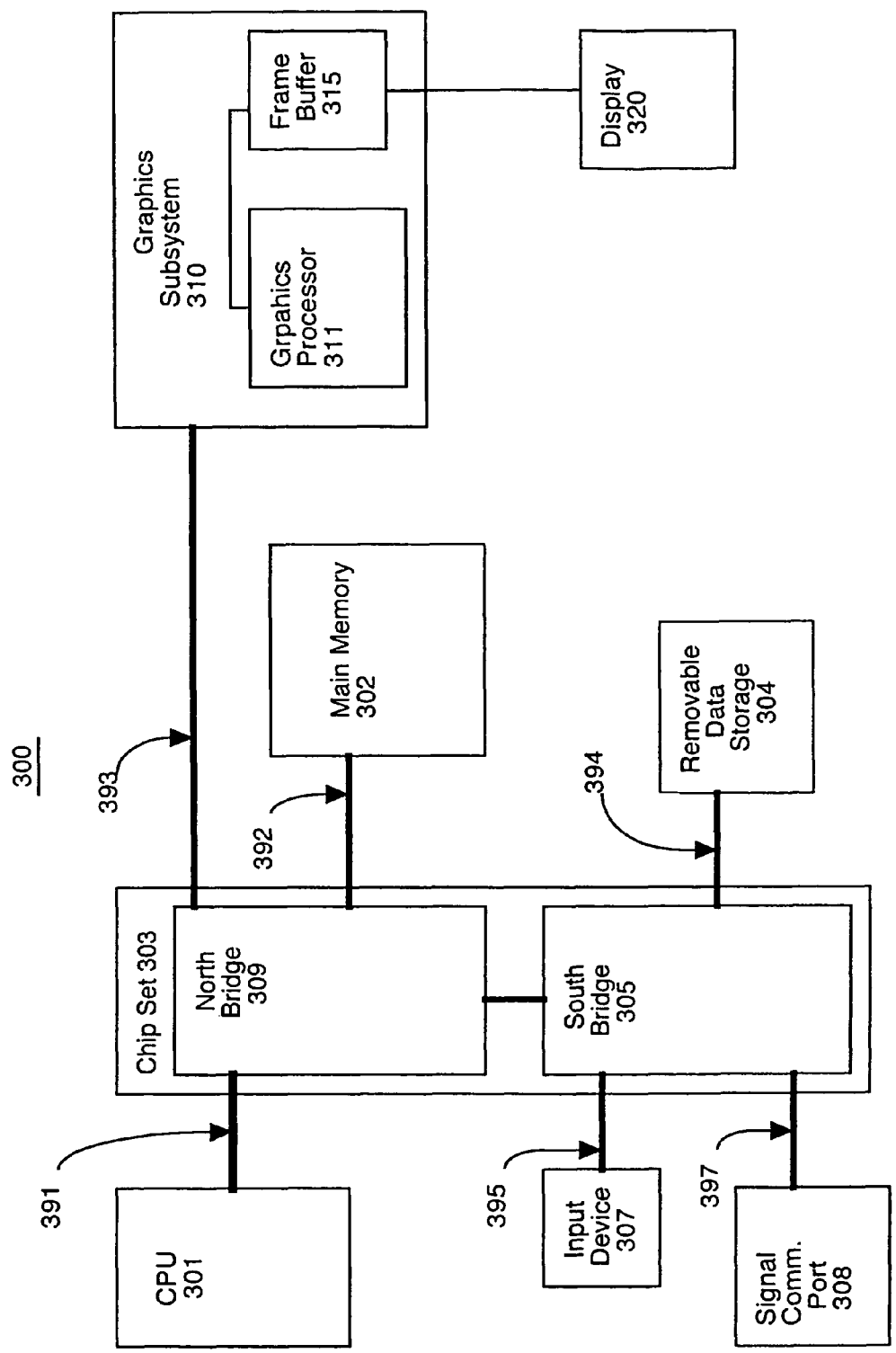
FIG. 3 is a block diagram of an exemplary computer system upon which embodiments of the present invention can be implemented.

FIG. 3 is a block diagram of a computer system 300, one embodiment of a computer system upon which embodiments of the present invention can be implemented. Computer system 300 includes central processor unit 301, main memory 302 (e.g., random access memory), chip set 303 with north bridge 309 and south bridge 305, removable data storage device 304, input device 307, signal communications port 308, and graphics subsystem 310 which is coupled to display 320. Computer system 300 includes several busses for communicatively coupling the components of computer system 300. Communication bus 391 (e.g., a front side bus) couples north bridge 309 of chipset 303 to central processor unit 301. Communication bus 392 (e.g., a main memory bus) couples north bridge 309 of chipset 303 to main memory 302. Communication bus 393 (e.g., the Advanced Graphics Port interface) couples north bridge of chipset 303 to graphic subsystem 310. Communication buses 394-397 (e.g., a PCI bus) couple south bridge 305 of chip set 303 to removable data storage device 304, input device 307, and signal communications port 308 respectively. Graphics subsystem 310 includes graphics processor 311 and graphics buffer 315.

The components of computer system 300 cooperatively operate to provide presentations of graphics images. Communications bus 391 through 397 communicate information. Central processor 301 processes information and performs pipeline instructions. Main memory 302 stores information and instructions for the central processor 301. Removable data storage device 304 also stores information and instructions (e.g., functioning as a large information reservoir). Input device 306 provides a mechanism for inputting information and/or for pointing to or highlighting information on display 320. Signal communication port 308 provides a communication interface to exterior devices (e.g., an interface with a network). Display device 309 displays information in accordance with data stored in frame buffer 315. Graphics processor 311 also performs pipeline instructions while processing graphics commands from central processor 301 and provides the resulting data to graphics buffer 315 for storage and retrieval by display monitor 320.

In one embodiment of the present invention, central processor 301 and graphics processor 311 processes pipeline information in accordance with the present invention. For example, the processors include an arithmetic logic unit for performing pipeline execution operations and the arithmetic logic unit can be controlled by a pipeline sub-clock. Central processors 301 and graphics processor 311 adjust respective pipeline stage cycle periods asynchronously in accordance with operations being executed and minimum timing limitations of the pipeline stages. For example, central processor 301 and graphics processor 311 can execute pipeline information in accordance with a pipeline sub-clock and the pipeline is controlled by an asynchronous pipeline clock. In one embodiment, system 300 includes a read only memory (ROM) component for storing information indicating a period of time to complete execution of an operation. For example, the ROM can include a decode operation timetable similar to table 121. Central processor 301 and graphics processor 311 can be utilized in the implementation of adjustable cycle pipeline system 100. Central processor 301 and graphics processor 311 can also be utilized to implement a present invention adjustable cycle pipeline method (e.g., adjustable pipeline stage cycle method 400).

Figure 4:
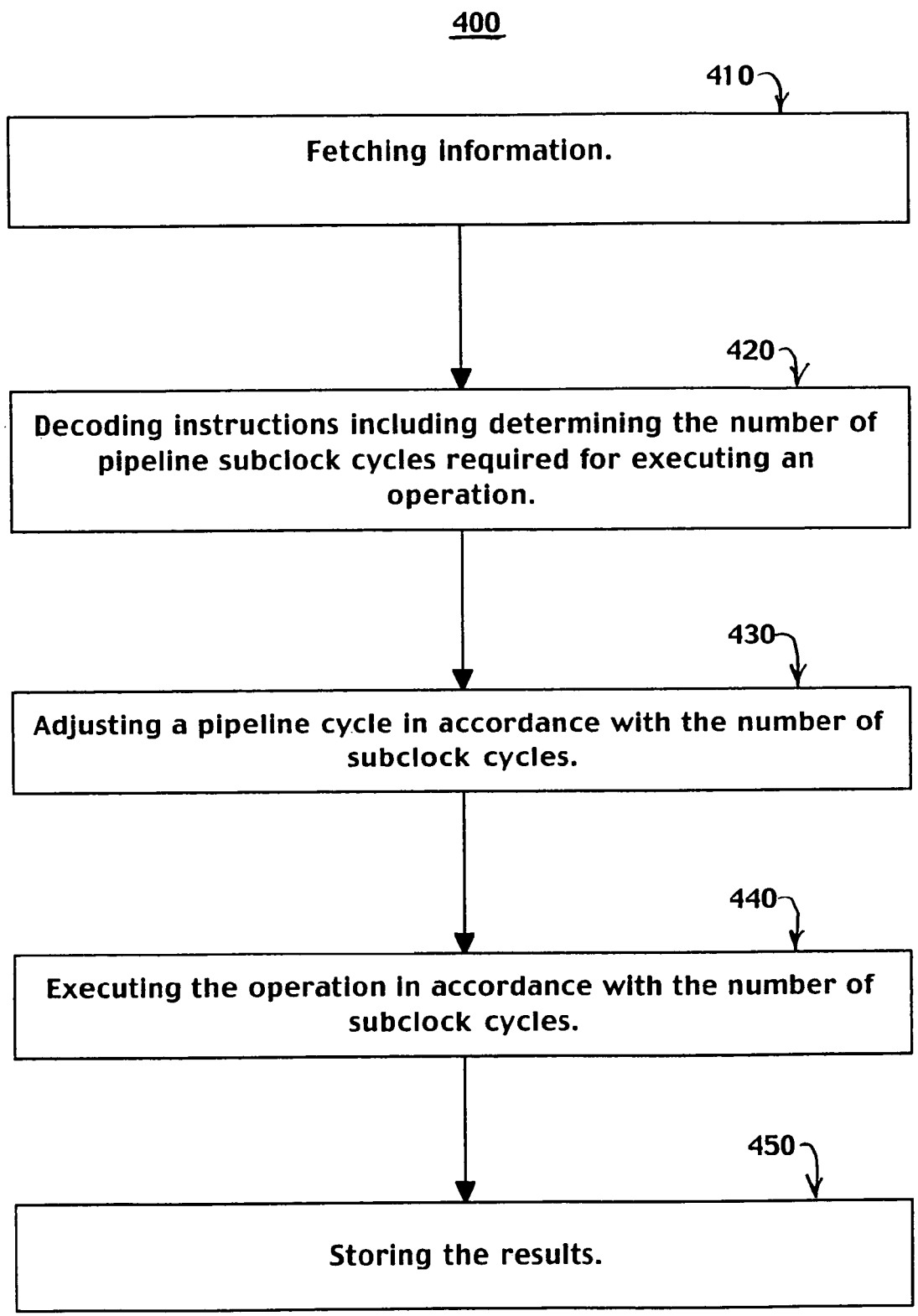
FIG. 4 is a flow chart of adjustable cycle pipeline method 400 in accordance with one embodiment of the present invention.

FIG. 4 is a flow chart of adjustable cycle pipeline method 400 in accordance with one embodiment of the present invention. Adjustable pipeline method 400 facilitates increased overall average pipeline processing speed by reducing "stall" time that would otherwise be required in the execution stage. In one embodiment, adjustable pipeline method 400 enables pipeline stage cycles to be adjusted (e.g., reduced) to match the time required to execute an operation and time is not "wasted" waiting to match a worst case execution stage scenario.

In step 410, information is fetched, including instructions associated with an operation. For example, information (e.g., data, instructions, etc.) associated with a pipeline operation is fetched from a memory.

At step 420, the instructions are decoded and a determination of a number of sub-clock cycles required for executing an operation is made. In one exemplary implementation, an execution sub-clock table is established and utilized in performance of the decoding. Execution sub-clock table maps the number of sub-clock cycles required for executing the operation. Different operations can have a different number of corresponding sub-clock cycles.

In step 430, a pipeline stage cycle is adjusted in accordance with the number of sub-clock cycles. In one exemplary implementation, the sub-clock cycles are counted and assertion of the pipeline stage cycle is triggered when the count of the sub-clock cycles equals the number of sub-clock cycles required for executing an operation.

The operation is executed at step 440 in accordance with the number of sub-clock cycles. The sub-clock frequency is faster than a pipeline stage cycle. Execution periods can vary for different operations. For example, execution of an addition operation can be completed in 4 pipeline sub-clock cycles in one exemplary implementation and a multiplication operation can be completed in 5 pipeline sub-clock cycles. The execution of the addition operation does not have to be "stalled" in the execution pipeline stage that would otherwise be required to match the duration of the multiplication operation execution period.

In step 450 results of the operation are stored. In one embodiment, graphics pipeline results are stored in a graphics buffer.

It is appreciated the present invention is readily implemented in a variety of applications. In one exemplary implementation, a present invention adjustable cycle system and method can be applied to a graphics pipeline and the pipeline stage cycle period adjusted according to execution of graphics stages (e.g., a rasterization stage, shading stage, etc.). It is also possible to change the number of sub-clock cycles assigned to execution of an operation. In one exemplary implementation, a random access memory (RAM) component stores information for indicating a period of time to complete execution of an operation, wherein the period of time can be reprogrammed.

Thus, the present invention facilitates increased average pipeline processing speed. Present invention adjustable cycle pipeline systems and methods minimize "stalls" in execution stages that would otherwise be required to compensate for differences in execution periods. Faster execution operations can be complete in a shorter period of time reducing the overall average pipeline throughput.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An adjustable cycle pipeline system comprising:
   a fetch stage for fetching information associated with an operation;
   a decode stage for decoding instructions including determining a number of execution sub-clock cycles utilized in executing each of said instructions and forwarding said number of execution sub-clock cycles to a pipeline stage clock if said fetch stage, said decode stage and a write stage can also be performed within said number of execution sub-clock cycles, wherein said decode stage includes a decode operation time table that maps each of said instructions to said number of execution sub-clock cycles utilized in executing each of said instructions;
   an execution stage for executing each of said instructions in accordance with said number of execution sub-clock cycles, wherein a sub-clock that generates said execution sub-clock cycles controls operations in said execution stage;
   said pipeline stage clock for generating said pipeline stage cycle, wherein said pipeline stage clock includes a counter for counting execution sub-clock cycles and when said counter reaches said number of pipeline sub-clock cycles received from said decode stage, a trigger edge of said pipeline stage clock is asserted to initiate a new pipeline stage cycle; and
   a sub-clock for generating said execution sub-clock cycles, wherein said execution sub-clock cycles are faster than said pipeline stage cycles;
   said write stage for writing results.

2. The adjustable cycle pipeline system of claim 1 wherein said adjusting of said sub-clock cycles in said pipeline cycle is limited by a minimum time constraint of a stage other than an execution stage.

3. The adjustable cycle pipeline system of claim 2 wherein a pipeline stage cycle is asynchronous.

4. The adjustable cycle pipeline system of claim 2 wherein a pipeline stage cycle is altered by increments of said sub-clock.

5. The adjustable cycle pipeline system of claim 2 wherein said execution stage includes a rasterization graphics processing stage and a shading graphics processing stage.

6. An adjustable cycle pipeline method comprising:
   fetching information including instructions associated with an operation;
   decoding said instructions including determining a number of sub-clock cycles required for executing an operation in an execution stage, wherein said decoding utilizes a sub-clock table in performance of said decoding and said sub-clock table maps said operation to a number of sub-clock cycles used in executing said operation, and wherein said decoding includes forwarding said number of sub-clock cycles to a pipeline stage clock;
   adjusting a pipeline stage cycle in accordance with said number of sub-clock cycles if a fetch stage, a decode stage and a write stage can also be performed within said number of sub-clock cycles, wherein said adjusting includes counting said sub-clock cycles;
   executing said operation in accordance with said number of sub-clock cycles, wherein a sub-clock that generates said sub-clock cycles controls operations in said execution stage and said sub-clock is faster than a pipeline stage clock that generates said pipeline stage cycle; and
   storing results of said operation.

7. The adjustable cycle pipeline method of claim 6 further comprising:
   triggering assertion of said pipeline stage cycle when said count of said sub-clock cycles equals said number of sub-clock cycles equal to executing an operation.

8. The adjustable cycle pipeline method of claim 6 wherein said number of sub-clock cycles differ in accordance with different operations.

9. A processing system comprising:
   a bus for communicating information;
   a memory communicatively coupled to said bus, said memory for storing said information;
   a processor communicatively coupled to said bus, said processor for executing operations in a pipeline in accordance with pipeline sub-clock cycles, wherein said number of sub-clock cycles in a pipeline stage cycle differ in accordance with different operations, wherein a decode operation time table maps each of said operations to a number of pipeline sub-clock cycles utilized in executing each of said operations and said number of pipeline sub-clock cycles is forwarded to a pipeline stage clock that is adjusted based upon a count of said sub-clock cycles if a fetch stage, a decode stage and a write stage can also be performed within said number of pipeline sub-clock cycles, wherein a frequency of said pipeline sub-clock cycles is faster than said pipeline stage cycle and said number of said pipeline sub-clock cycles associated with said operations can be reprogrammed.

10. The processing system of claim 9 wherein stage cycles of pipeline are controlled by an asynchronous pipeline clock.

11. The processing system of claim 9 further comprising a read only memory (ROM) component for storing information indicating a number of said pipeline sub-clock cycles to complete execution of an operation.

12. The processing system of claim 11 wherein said read only memory (ROM) component includes said decode operation time table.

13. The processing system of claim 9 wherein said processor includes an arithmetic logic unit for performing pipeline execution operations, wherein said arithmetic logic unit is controlled by said pipeline sub-clock cycles.

14. The processing system of claim 9 wherein said pipeline stage cycle period is changed in accordance with an operation execution in said pipeline.

15. The processing system of claim 9 further comprising a random access memory (RAM) component for storing information for indicating said number of said pipeline sub-clock cycles.

16. The processing system of claim 9 wherein execution time of different operations are non-integral full cycle multiples of one another.

\* \* \* \* \*